(12) United States Patent
Lu et al.

(10) Patent No.: US 7,690,214 B2
(45) Date of Patent: Apr. 6, 2010

(54) MICRO-SPRAY COOLING SYSTEM

(75) Inventors: Chun-Fu Lu, Hsinchu (TW);
Jinn-Cherng Yang, Yilan County (TW);
Chun-Jung Chen, Yunlin (TW);
Kuo-Hsiang Chien, Hsinchu County
(TW); Shih-Kuo Wu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 133 days.

(21) Appl. No.: 11/733,175

(22) Filed: Apr. 9, 2007

(65) Prior Publication Data

US 2008/0101024 A1     May 1, 2008

(30) Foreign Application Priority Data

Oct. 24, 2006   (TW) .............................. 95139157 A

(51) Int. Cl.
  *F25D 23/12* (2006.01)
(52) U.S. Cl. .......................................... 62/259.2; 62/64
(58) Field of Classification Search ................ 62/259.2, 62/64; 361/688, 699; 165/104.33
See application file for complete search history.

(56) References Cited

U.S. PATENT DOCUMENTS

| 5,629,573 | A | 5/1997 | Ponnappan et al. | |
|---|---|---|---|---|
| 5,943,211 | A | 8/1999 | Havey et al. | |
| 6,139,361 | A * | 10/2000 | Przilas et al. | 439/559 |
| 6,247,525 | B1 | 6/2001 | Smith et al. | |
| 6,349,554 | B2 * | 2/2002 | Patel et al. | 62/259.2 |
| 6,629,646 | B1 | 10/2003 | Ivri | |
| 6,650,542 | B1 | 11/2003 | Chrysler et al. | |
| 7,082,778 | B2 * | 8/2006 | Patel et al. | 62/259.2 |
| 7,299,647 | B2 * | 11/2007 | Tilton et al. | 62/259.2 |

FOREIGN PATENT DOCUMENTS

| TW | 508487 | 11/2002 |
|---|---|---|
| TW | 550233 | 9/2003 |

\* cited by examiner

*Primary Examiner*—Melvin Jones
(74) *Attorney, Agent, or Firm*—Quintero Law Office

(57) ABSTRACT

A micro-spray cooling system for a plurality of heat sources includes an evaporator contacting the heat sources and comprising a plurality of actuators corresponding to the heat sources, a condenser connected to the evaporator, and at least one driving circuit connected to the actuators to drive some or all of the actuators sequentially according to a predetermined timing to cool the heat sources. The refrigerant in the evaporator is sprayed by the actuators to thermally contact the heat sources, evaporated by heat from the heat sources, condensed in the condenser and re-enters the evaporator.

13 Claims, 10 Drawing Sheets

# MICRO-SPRAY COOLING SYSTEM

BACKGROUND OF THE INVENTION

1. Field of the Invention

The invention relates to micro-spray cooling, and in particular to a micro-spray cooling system with piezoelectric actuators to vibrate and spray refrigerant.

2. Description of the Related Art

The speed of a computer depends on processing speed of a central processing unit, which generates heat, which must in turn be dissipated by various methods.

A conventional method for heat dissipation employs fins for heat conduction and fans for heat convection. Fans and fins cannot, however, satisfy the requirements for heat dissipation of many current high speed desktop computers. Nor are they able to satisfy the requirement of heat dissipation over 100 W for a compact laptop. As heat can be absorbed by a refrigerant as latent heat during phase change, the phase change method is preferred.

As heat dissipation modules for a laptop must be as flat as possible to conserve height and space, a heat pipe is applicable therein. The heat pipe, however, is a passive cooling device which depends on heat convection by phase change and is not capable of actively controlling heat dissipation.

BRIEF SUMMARY OF INVENTION

An embodiment of a micro-spray cooling system for a plurality of heat sources comprises an evaporator contacting the heat sources and comprising a plurality of actuators corresponding to the heat sources, a condenser connected to the evaporator, and at least one driving circuit connected to the actuators to drive some or all of the actuators sequentially according to a predetermined timing to cool the heat sources. The refrigerant in the evaporator, sprayed by the actuators to thermally contact the heat sources, is evaporated by heat from the heat sources, condensed in the condenser and re-enters the evaporator.

The evaporator comprises at least one chamber storing the refrigerant and at least one evaporation chamber thermally contacting the heat sources, and the refrigerant is sprayed by the actuators disposed above the storage chamber to the evaporation chamber to thermally contact the heat sources.

The evaporator further comprises a main body and a plurality of spray sheets disposed within the main body. Each spray sheet has at least one hole and divides the main body into the storage chamber and the evaporation chamber. The actuators are disposed on the spray sheets and vibrate the spray sheets to spray the refrigerant to the evaporation chamber via the holes. The actuators are piezoelectric elements. The actuators are annular and encircle the hole.

The driving circuit controls the vibration amplitude and frequency of the actuators. A negative pressure generated in the storage chamber by the vibration of the actuators enables the refrigerant to flow from the condenser into the storage chamber.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
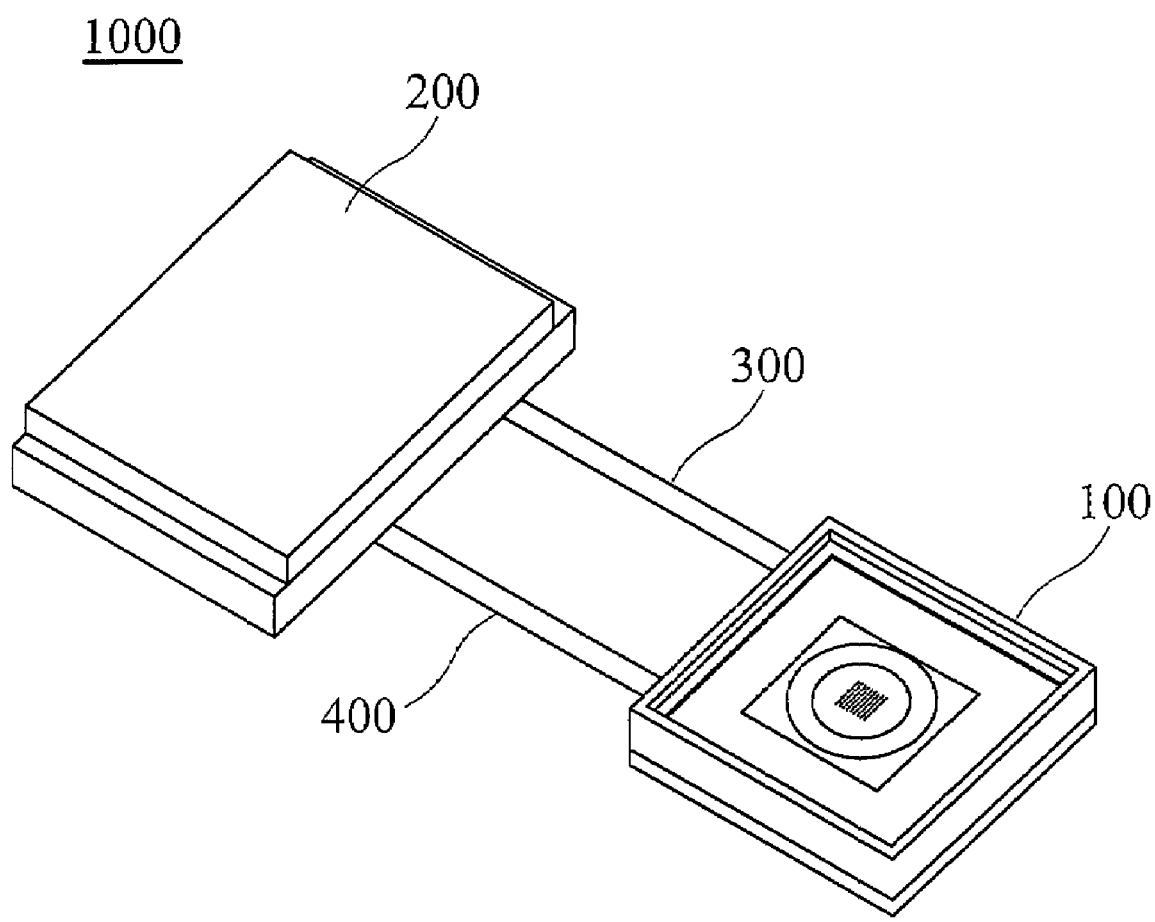
FIG. 1 is a schematic view of an embodiment of a micro-spray cooling system of the invention.

Referring to FIG. 1, a micro-spray cooling system 1000 comprises an evaporator 100, a condenser 200 and ducts 300 and 400 connecting the evaporator 100 and condenser 200.

Figure 2:
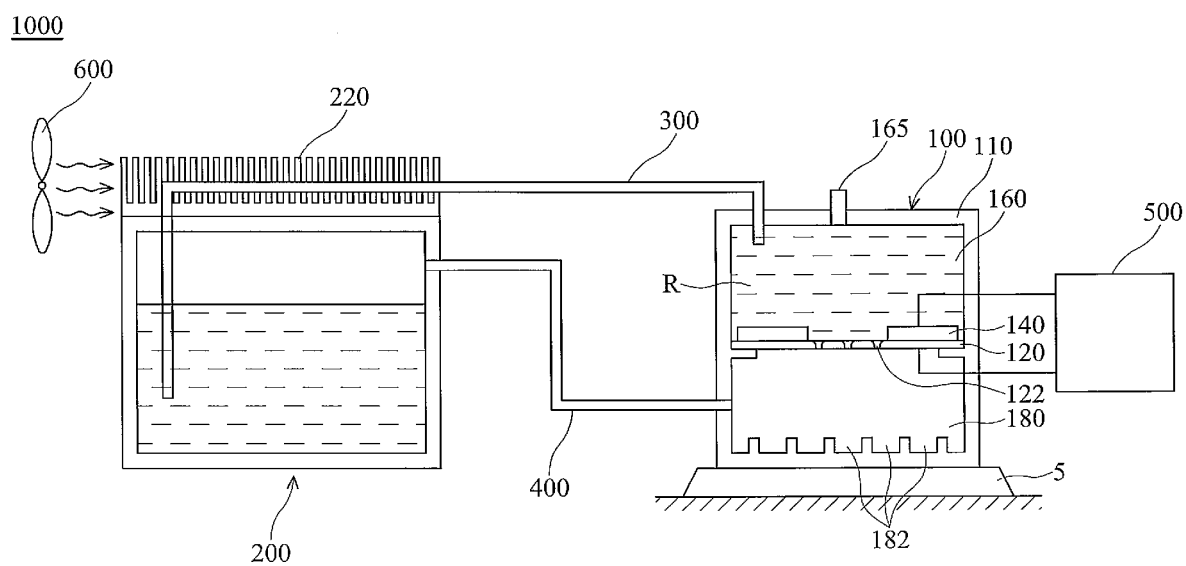
FIG. 2 is a schematic view of detailed structure of a micro-spray cooling system of the invention.

Referring to FIG. 2, the evaporator 100 comprises a main body 110, a spray sheet 120 and an actuator 140. A chamber is formed in the main body 110. The spray sheet 120 is disposed in the main body 110 and divides the chamber into a storage chamber 160 and an evaporation chamber 180. Refrigerant R is stored in the storage chamber 160. The evaporation chamber 180 contacts a heat source 5. A plurality of holes 122 is formed on the central portion of the spray sheet 120. The actuator 140 comprises piezoelectric elements connected to a driving circuit 500. The driving circuit 500 controls the actuator 140 to vibrate the spray sheet 120. The vibration pushes the liquid refrigerant R stored in the storage chamber 160. The pressured liquid refrigerant R passes through the holes 122 and is sprayed into the evaporation chamber 180. As the evaporation chamber 180 contacts the heat source 5, heat is absorbed by the liquid refrigerant R as latent heat. The latent heat causes phase change of the liquid refrigerant R to refrigerant vapor. To increase heat dissipation area, a plurality of slots 182 is formed on the walls or the bottom of the evaporation chamber 180. An exit 165 is formed on the storage chamber 160 to purge unnecessary refrigerant vapor.

The refrigerant vapor flows through the duct 400 to the condenser 200 with fins 220 on the top thereof. Refrigerant vapor is condensed by conducting latent heat to the fins 220. The heat conducted to the fins 220 is dissipated by force convection caused by a fan unit 600.

When the spray sheet 120 vibrates to push the liquid refrigerant R in the storage chamber 160, a part of the liquid refrigerant R passes through the holes 122 to spray into the evaporation chamber 180. As the liquid refrigerant R decreases, the refrigerant pressure in the storage chamber 160 is less than that in the condenser 200, whereby the liquid refrigerant R flows from the condenser 200 to the storage chamber 160 via the duct 300 due to pressure difference.

The liquid refrigerant R is sprayed into the evaporation chamber 180 by vibration of the spray sheet 120, absorbs heat of the heat source 5, and evaporates. The refrigerant vapor flows through the duct 400 to the condenser 200 and condenses therein. The pressure difference causes the liquid refrigerant to flow into the storage chamber 160. Completing the cycle of refrigerant for heat dissipation.

Figure 3:
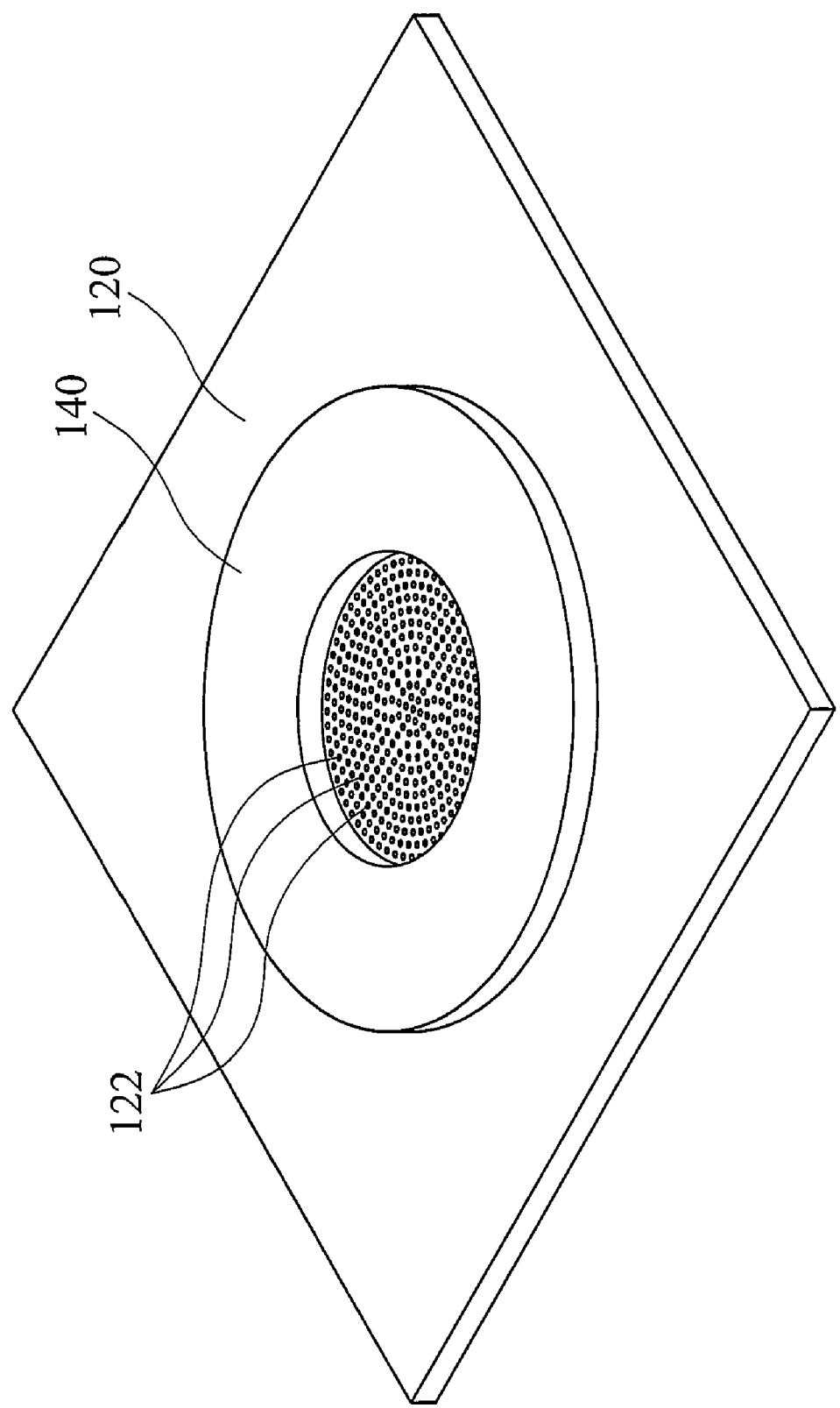
FIG. 3 is a schematic view showing an actuator assembled to a spray sheet.

FIG. 3 depicts the spray sheet 120 assembled to the actuator 140. In this embodiment, the actuator 140 is annular and bonded to the spray sheet 120 by thermal pressing.

In the embodiment, only one spray sheet 120 and one actuator 140 are used. The size of the actuator 140 is limited by power supply, for example, when the power supply is under 3 W, the size of the annular actuator 140 is limited to an outer diameter of 14 mm and inner diameter of 8 mm. In such a structure, the spray area is limited to a diameter of 8 mm. A heat sink of the Intel CPU is 31 min×31 mm, exceeding the spray area. The small spray area causes poor heat dissipation efficiency, non-uniform temperature in heat sink, and accumulation of liquid refrigerant due to local fast cooling. If the liquid refrigerant is accumulated near the hole 122, the liquid refrigerant may jam. The structure of the spray sheet 120 is described as follows.

Figure 4A:
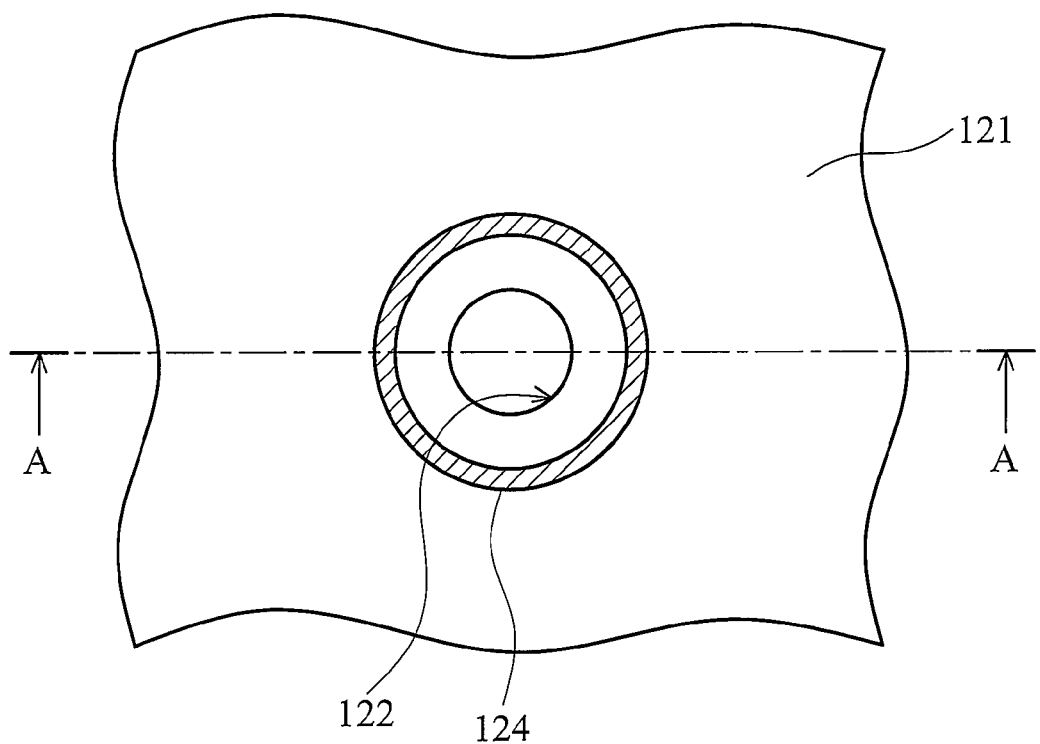
FIG. 4*a* depict the structure of an embodiment of the spray sheet of the invention.
Figure 4B:
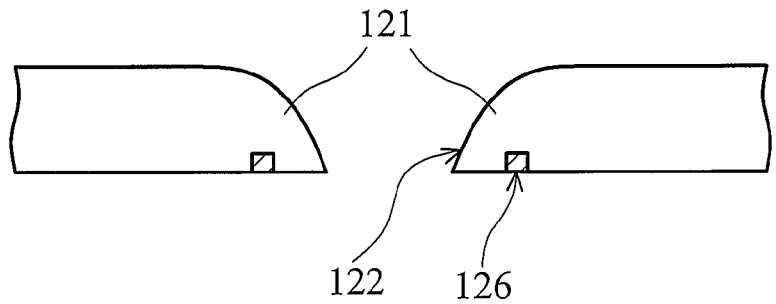
FIG. 4*b* is a cross section along line A-A of FIG. 4*a*.
Figure 4C:
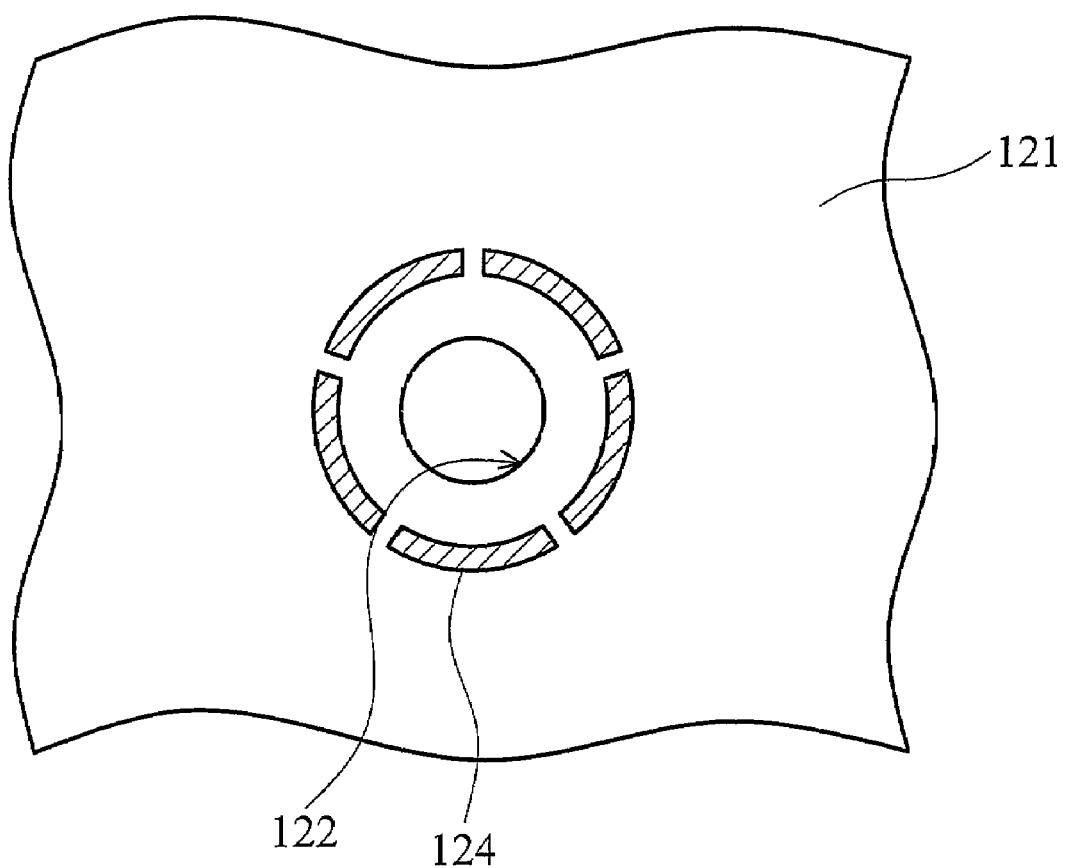
FIG. 4*c* depicts another embodiment of the spray sheet of the invention.

The spray sheet 120, shown in FIG. 4a, comprises a nozzle layer 121 having a wetting angle, a hole 122 formed on the nozzle layer 121, and a trench 124 formed on the nozzle layer 121. The trench 124 is around the hole 122 and separated from the hole 122 by an appropriate distance shown in FIG. 4b. The trench 144 is formed as ring-shaped and continuous. In another embodiment, the trench 124 is ring-shaped, but discontinuous as shown in FIG. 4c. A filler 126 having a wetting angle is filled in the trench 124. The wetting angle of the surface of the filler 126 is different from the wetting angle of the surface of the nozzle layer 121. The difference of the wetting angle causes the accumulation of the liquid refrigerant around the hole 122 and prevents the liquid refrigerant from flowing randomly to other regions of the nozzle layer 121.

Accordingly, the micro-spray cooling system comprises a plurality of actuators arranged in an array for a larger heat source. The storage chamber 160 and the evaporation chamber 180 can be shared by several actuators, or each actuator can correspond to individual storage chamber and evaporation chamber.

Figure 5:
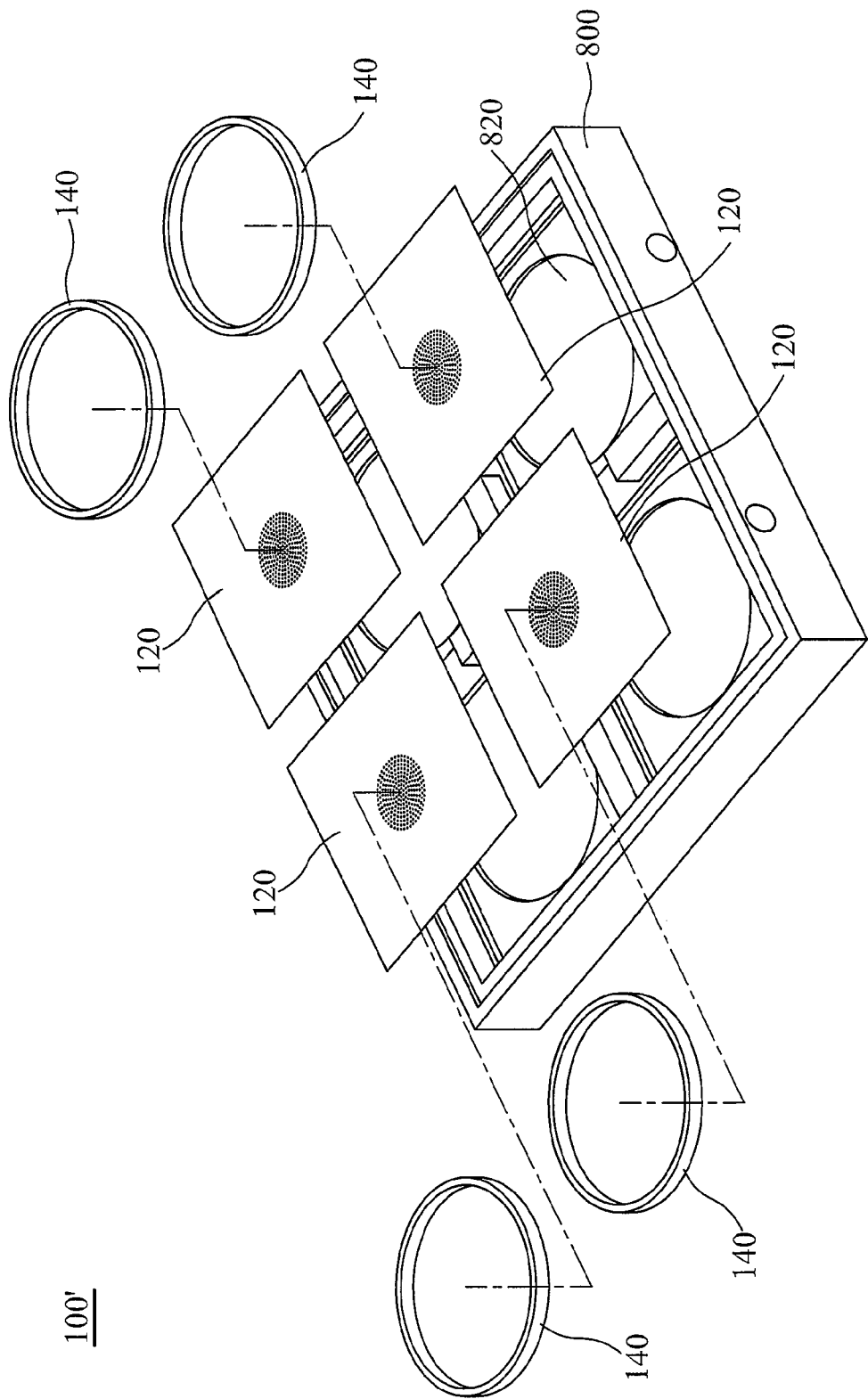
FIG. 5 is a schematic view of another embodiment of a micro-spray cooling system of the invention.
Figure 6A:
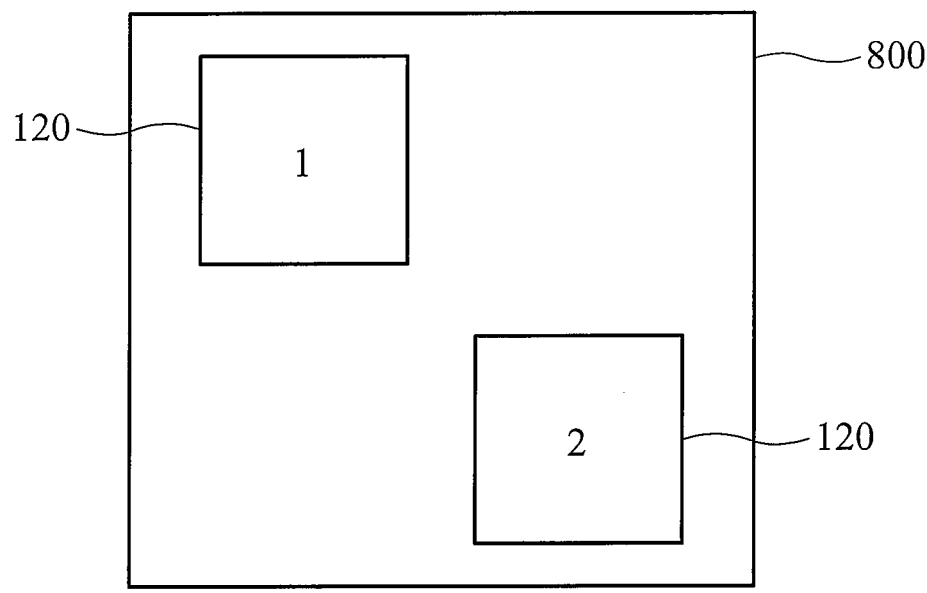
FIGS. 6*a*~6*d* depict the micro-spray cooling system of the invention applied to a dual core processor.
Figure 6B:
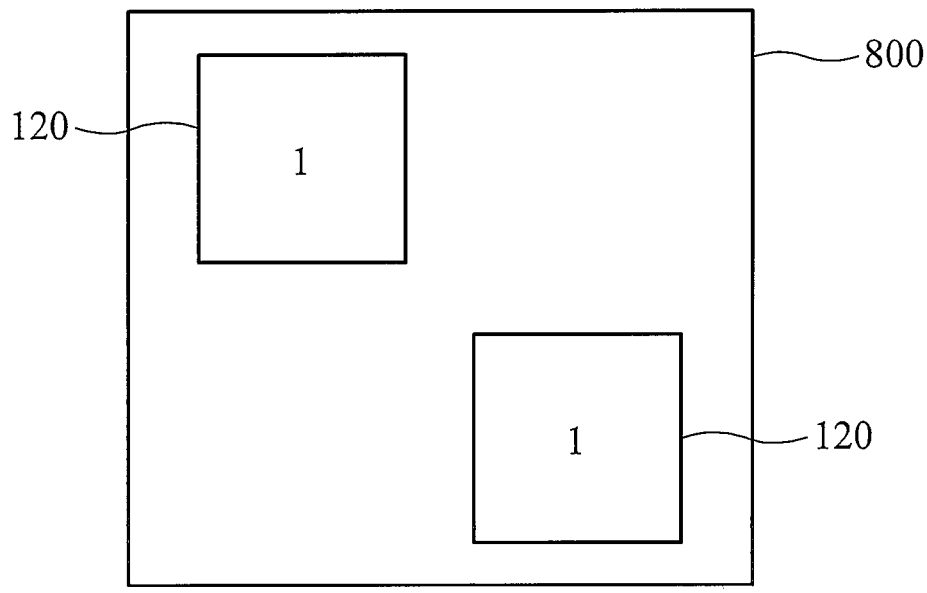
Figure 6C:
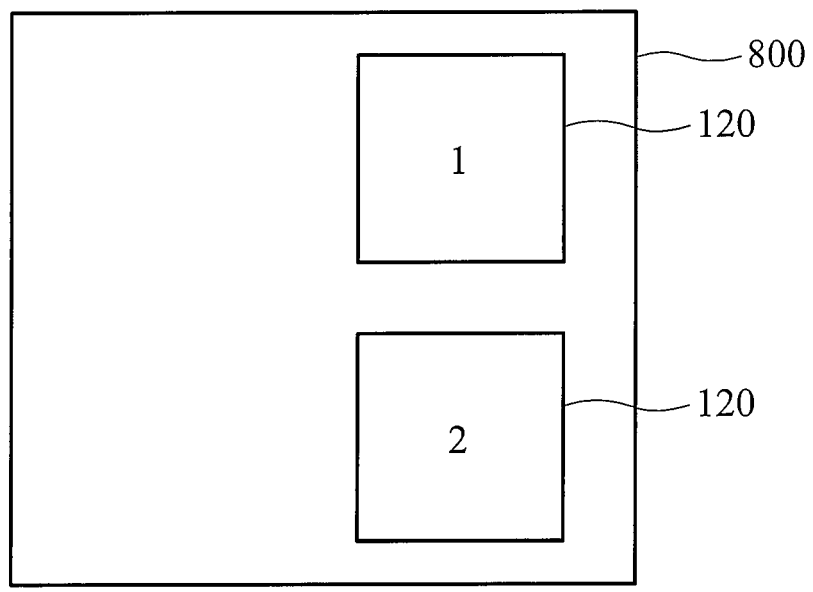
Figure 6D:
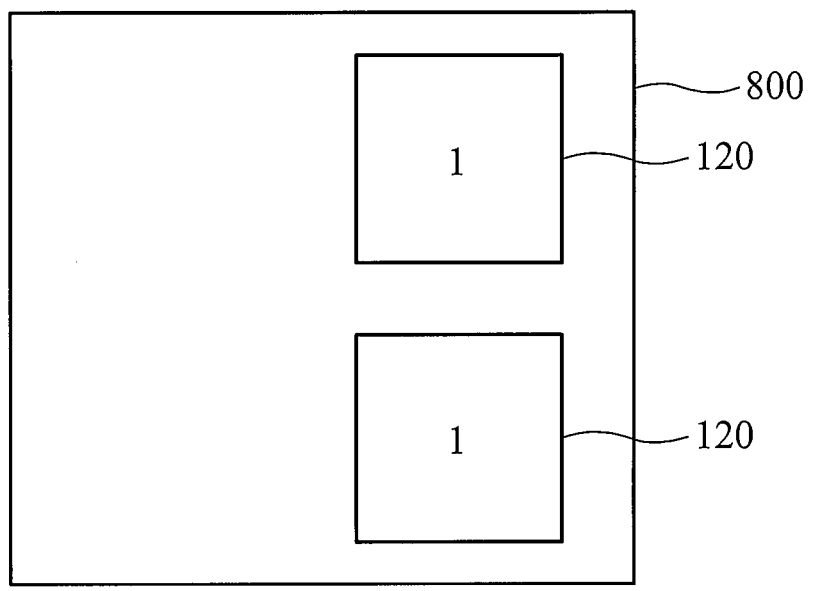

FIG. 5 depicts another embodiment of the micro-spray cooling system. The evaporator 100' further comprises a fixture 800 having four positioning structures 820 which are arranged in an array of 2×2. Each positioning structure 820 receives a spray sheet 120 and an actuator 140. The driving circuit 500 drives a part or all of the actuators 140 sequentially according to a predetermined timing. FIGS. 6a~6d depict a cooling method for a CPU with dual cores. In FIGS. 6a and 6b, the CPU with dual cores is arranged diagonally. FIG. 6a shows the spray sheet 120 and the actuator 140 driven sequentially. The number in the spray sheet 120 represents the actuating order. FIG. 6b shows the actuators 140 and the spray sheets 120 are driven simultaneously. In FIGS. 6c and 6d, the CPU with dual cores is arranged on the same side. FIG. 6c shows the spray sheet 120 and the actuator 140 driven sequentially. The number in the spray sheet 120 represents the actuating order. FIG. 6d shows the actuators 140 and the spray sheets 120 driven simultaneously.

Figure 7A:
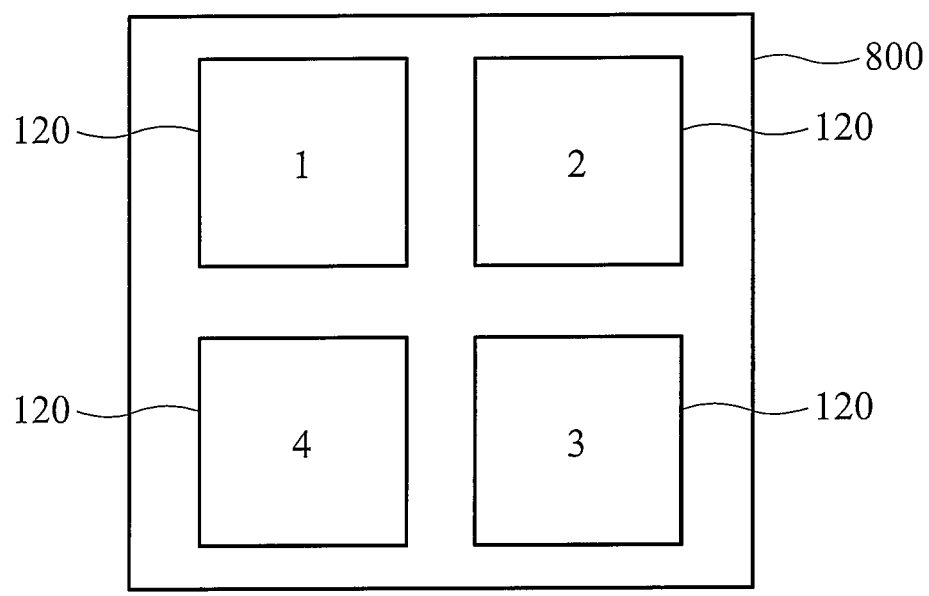
FIGS. 7*a*~7*d* depict the micro-spray cooling system of the invention applied to a multiple core processor.
Figure 7B:
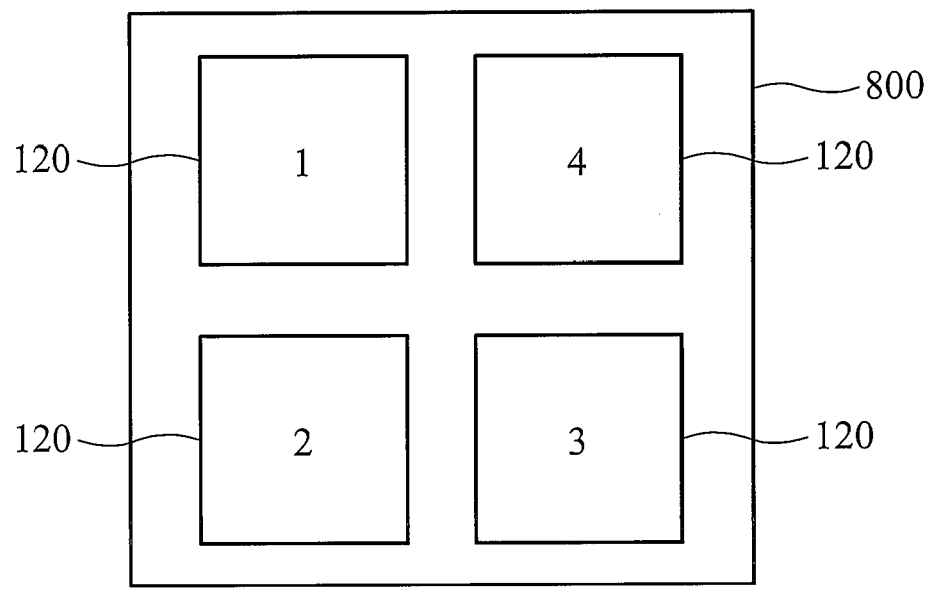
Figure 7C:
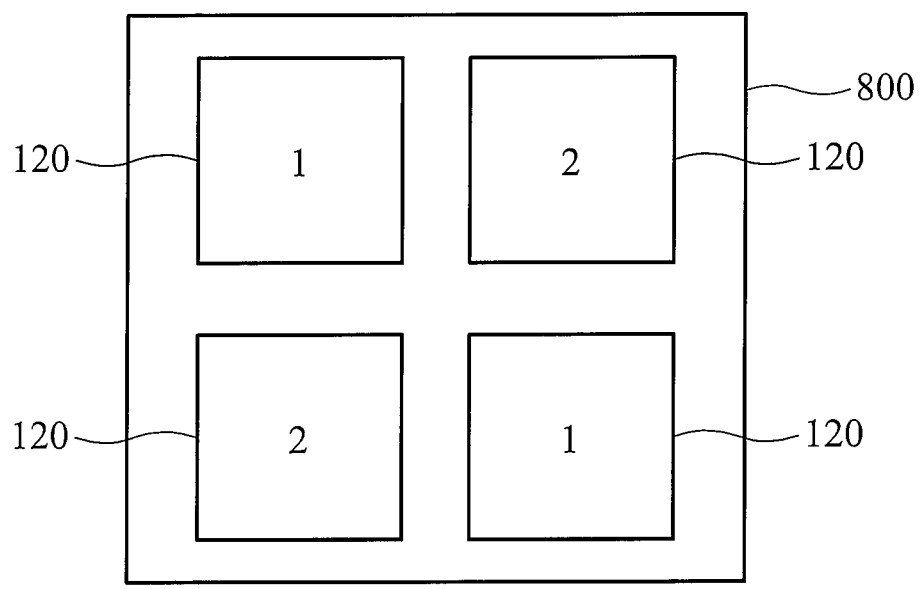
Figure 7D:
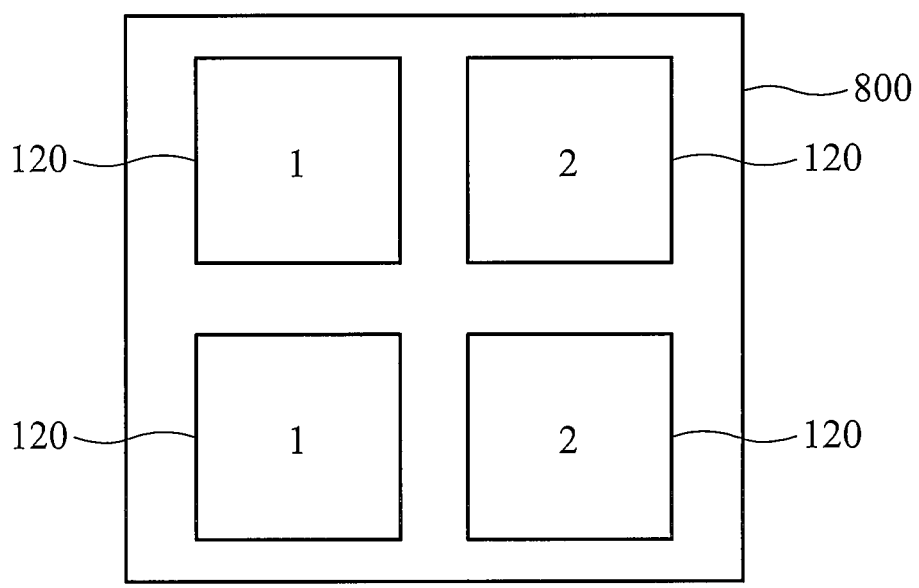

FIGS. 7a~7d depict a cooling method for a CPU with multiple cores. For the CPU with multiple cores, a clockwise sequence of driving the spray sheet 120 and the actuator 140 is used as shown in FIG. 7a. The number in the spray sheet 120 represents the actuating order. A counterclockwise sequence of driving the spray sheet 120 and the actuator 140 is used as shown in FIG. 7b. A diagonal sequence (FIG. 7c) or side-by-side sequence (FIG. 7d) can also be applicable.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A micro-spray cooling system for a plurality of heat sources, comprising:
    an evaporator contacting the plurality of heat sources, comprising and at least one storage chamber and a plurality of piezoelectric actuators corresponding to the plurality of heat sources;
    a condenser connected to the evaporator; and
    at least one driving circuit connected to the piezoelectric actuators to drive some or all of the piezoelectric actuators sequentially according to a predetermined timing to cool the plurality of heat sources, wherein refrigerant stored in the at least one storage chamber of the evaporator is sprayed by the piezoelectric actuators to thermally contact the plurality of heat sources, evaporated by heat from the plurality of heat sources, condensed in the condenser, and re-enters the evaporator, and wherein the driving circuit controls a vibration amplitude and a frequency of the piezoelectric actuators, and a negative pressure generated in the at least one storage chamber by the vibration of the piezoelectric actuators enables the refrigerant to flow from the condenser into the at least one storage chamber.

2. The micro-spray cooling system as claimed in claim 1, wherein the evaporator further comprises at least one evaporation chamber thermally contacting the plurality of heat sources and comprising a plurality of walls thereon, and the refrigerant is sprayed by the piezoelectric actuators disposed above the at least one storage chamber to the at least one evaporation chamber to thermally contact the plurality of heat sources.

3. The micro-spray cooling system as claimed in claim 2, wherein the evaporator further comprises a main body and a plurality of spray sheets disposed within the main body, and each of the plurality of spray sheets has at least one hole encircled by the piezoelectric actuators and divides the main body into the at least one storage chamber and the at least one evaporation chamber, and the piezoelectric actuators are disposed on the plurality of spray sheets and vibrate the plurality of spray sheets to spray the refrigerant to the at least one evaporation chamber via the holes of the plurality of spray sheets.

4. The micro-spray cooling system as claimed in claim 3, wherein the actuators are annular and encircle the holes of the plurality of spray sheets.

5. The micro-spray cooling system as claimed in claim 2, wherein a plurality of slots are formed on the plurality of walls of the at least one evaporation chamber.

6. The micro-spray cooling system as claimed in claim 2 further comprising a positioning structure positioning the plurality of spray sheets to align with the plurality of heat sources.

7. The micro-spray cooling system as claimed in claim 1, wherein the plurality of heat sources constitute a heating element.

8. The micro-spray cooling system as claimed in claim 3, wherein each of the plurality of spray sheets further comprise:
    a nozzle layer on which the at least one hole is formed; and
    a trench formed on the nozzle layer, disposed around the at least one hole and separated from the at least one hole by an appropriate distance.

9. The micro-spray cooling system as claimed in claim 8, wherein the trench of the spray sheet comprises a ring shaped trench.

10. The micro-spray cooling system as claimed in claim 8, wherein the trench of the spray sheet comprises a continuous trench.

11. The micro-spray cooling system as claimed in claim 8, wherein the trench of the spray sheet comprises a discontinuous trench.

12. The micro-spray cooling system as claimed in claim 8 further comprising a filler comprising a wetting angle at one surface thereof and filling in the trench of the spray sheet and the nozzle layer comprises a wetting angle, wherein the wetting angle of the surface of the filler is different from the wetting angle of the surface of the nozzle layer.

13. The micro-spray cooling system as claimed in claim 3, wherein the at least one hole is tapered.

\* \* \* \* \*